United States Patent
DiPoala

(10) Patent No.: US 10,338,206 B2
(45) Date of Patent: Jul. 2, 2019

(54) ULTRA-WIDEBAND RADAR WITH NORMALIZED SENSITIVITY

(71) Applicant: Robert Bosch GmbH, Stuttgart (DE)

(72) Inventor: William DiPoala, Fairport, NY (US)

(73) Assignee: Robert Bosch GmbH, Stuttgart (DE)

( * ) Notice: Subject to any disclaimer, the term of this patent is extended or adjusted under 35 U.S.C. 154(b) by 338 days.

(21) Appl. No.: 15/187,882

(22) Filed: Jun. 21, 2016

(65) Prior Publication Data

US 2017/0363729 A1    Dec. 21, 2017

(51) Int. Cl.
| | |
|---|---|
| *G01S 13/02* | (2006.01) |
| *G01S 13/04* | (2006.01) |
| *G01S 7/41* | (2006.01) |
| *G01S 13/56* | (2006.01) |
| *G01S 13/88* | (2006.01) |

(52) U.S. Cl.
CPC .............. *G01S 13/04* (2013.01); *G01S 7/415* (2013.01); *G01S 13/0209* (2013.01); *G01S 13/56* (2013.01); *G01S 13/886* (2013.01)

(58) Field of Classification Search
CPC ...... G01S 13/0209; G01S 13/04; G01S 13/56; G01S 13/886; G01S 7/415
USPC .......................................................... 342/28
See application file for complete search history.

(56) References Cited

U.S. PATENT DOCUMENTS

| | | | | |
|---|---|---|---|---|
| 4,054,871 A * | 10/1977 | Terrell | .................... | G01S 13/56 |
| | | | | 340/554 |
| 5,351,054 A | 9/1994 | Fredericks et al. | | |
| 5,353,033 A * | 10/1994 | Newberg | ............. | H01Q 3/2676 |
| | | | | 342/154 |
| 5,892,479 A * | 4/1999 | Mills | .................... | G01S 7/4052 |
| | | | | 342/169 |
| 6,420,995 B1 | 7/2002 | Richmond et al. | | |
| 6,535,161 B1 | 3/2003 | McEwan | | |
| 6,697,011 B2 | 2/2004 | Yabugaki | | |
| 7,541,971 B1 * | 6/2009 | Woodell | .................. | G01S 7/285 |
| | | | | 342/173 |
| 7,952,515 B2 | 5/2011 | McEwan | | |
| 8,106,825 B1 * | 1/2012 | Wangsness | ............ | H01Q 25/00 |
| | | | | 342/368 |

(Continued)

FOREIGN PATENT DOCUMENTS

EP    2045621    4/2009

*Primary Examiner* — Timothy A Brainard
(74) *Attorney, Agent, or Firm* — Michael Best & Friedrich LLP

(57) ABSTRACT

A motion detector and a method for operating the motion detector including a radio frequency (RF) transmission circuit, an RF reception circuit, and a controller that is electrically coupled to the RF transmission circuit and the RF reception circuit. The controller is configured to control the RF transmission circuit to generate an RF signal and control the RF reception circuit to receive a reflected RF signal from a target object in a predetermined time for reception after transmission of the RF signal. The controller is further configured to control the RF reception circuit to generate a Doppler signal indicative of a distance between the target object and the motion detection system based on the reflected RF signal. The controller is further configured to adjust a sensitivity of the RF reception circuit during the predetermined time for reception and activate an indicator based on the magnitude of the Doppler signal.

14 Claims, 10 Drawing Sheets

(56) References Cited

U.S. PATENT DOCUMENTS

| | | | |
|---|---|---|---|
| 2003/0236460 A1* | 12/2003 | Ma | A61B 8/06 600/441 |
| 2009/0309785 A1* | 12/2009 | Nalezinski | G01S 7/021 342/200 |
| 2015/0160067 A1 | 6/2015 | Sai | |
| 2015/0204968 A1* | 7/2015 | Ding | G01S 7/038 342/174 |

* cited by examiner

ULTRA-WIDEBAND RADAR WITH NORMALIZED SENSITIVITY

FIELD

Embodiments relate to motion detection systems.

BACKGROUND

Modern surveillance systems incorporate various types of sensors for detecting persons within an area under surveillance. In some instances, the surveillance systems include a motion detector that uses radio frequency (RF) waves to sense motion of objects within the area under surveillance. In such cases, the motion detector transmits an RF wave and receives a reflected RF wave from the object. Based on when the reflected waves are received, a distance between the object and the motion detector can be determined. The motion detector may monitor the distance between the object and the motion detector over time and trigger a notification or alarm when motion is detected. In this way, the motion detector may detect the presence of a person, for example an intruder, in the area under surveillance.

However, in some cases, the motion detector may detect motion from other objects besides persons. For example, the motion detector may detect motion of insects, rodents, birds, and the like. As a consequence, false alarms may be triggered by the motion detector. Due to the nature of using reflected RF waves, motion detectors are highly sensitive to motion caused by close objects and less sensitive to objects further away. In addition, to detect persons at large distances, the motion detector must be sensitive to low amplitude reflections. As a consequence, motion detectors as currently known in the art balance long detection ranges with a quantity of false alarms.

FIG. 1 illustrates a graph of signal strength of the reflected RF wave versus distance to an object for a motion detector known in the art. The graph includes examples of signal strength for various objects detected by the motion detector over a detection range. In this example, the detected objects include a person, a rodent, and a bug. A threshold 120 determines when a controller triggers an alarm based on the signal strength. For example, when the signal strength is greater in amplitude than the threshold 120, a controller triggers an alarm. As illustrated, when the detected objects are near in distance to the motion detector (for example, under 4 feet), the reflected RF waves and associated signal strengths are high in amplitude. As a consequence, the person, the rodent, and the bug all trigger the alarm at close distances. This results in false alarms when the objects are at close range.

SUMMARY

Embodiments provide, among other things, a system and a method of motion detection that provides a solution to the above-listed problems. In these embodiments, the motion detector automatically adjusts its sensitivity to reflected RF waves.

One embodiment provides a motion detector including a radio frequency (RF) transmission circuit, an RF reception circuit, and a controller that is electrically coupled to the RF transmission circuit and the RF reception circuit. The controller is configured to control the RF transmission circuit to generate an RF signal and control the RF reception circuit to receive a reflected RF signal from a target object in a predetermined time for reception after transmission of the RF signal. The controller is further configured to control the RF reception circuit to generate a Doppler signal indicative of a distance between the target object and the motion detection system based on the reflected RF signal. The controller is further configured to adjust a sensitivity of the RF reception circuit during the predetermined time for reception and activate an indicator based, at least in part, on the magnitude of the Doppler signal.

Another embodiment provides a method of detecting motion with a motion detector. The method includes generating an RF signal with a radio frequency (RF) transmission circuit and receiving a reflected RF signal from a target object in a predetermined time for reception after transmission of the RF signal. The controller generates a Doppler signal indicative of a distance to the target object based on the reflected RF signal and adjusts a sensitivity of the RF reception circuit during the predetermined time for reception. The controller then activates an indicator based, at least in part, on the magnitude of the Doppler signal.

DETAILED DESCRIPTION

Before any embodiments are explained in detail, it is to be understood that the invention is not limited in its application to the details of construction and the arrangement of components set forth in the following description or illustrated in the following drawings. Embodiments are capable of being practiced or of being carried out in various ways.

A plurality of hardware and software based devices, as well as a plurality of different structural components may be used to implement the invention. In addition, embodiments of the invention may include hardware, software, and electronic components that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. As such, a plurality of hardware- and software-based devices, as well as a plurality of different structural components may be utilized to implement embodiments of the invention. For example, "controllers" described in the specification can include one or more processors, one or more memory modules including non-transitory computer-readable medium, one or more input/output interfaces, and various connections (for example, a system bus) connecting the components.

Figure 2:
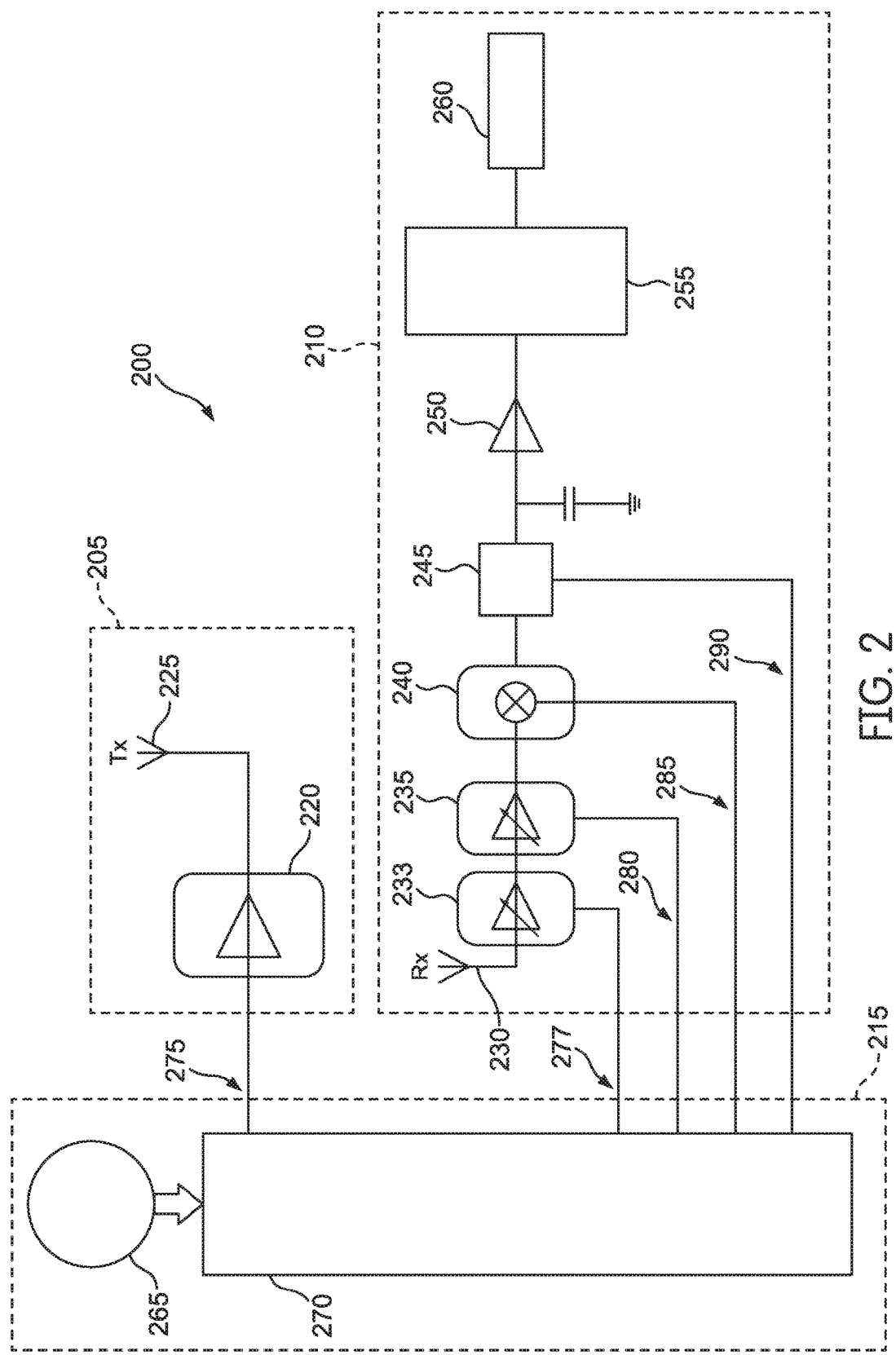
FIG. 2 is a diagram of a motion detector with normalized sensitivity according to one embodiment.

FIG. 2 illustrates a motion detector 200 with normalized sensitivity according to one embodiment. In the example illustrated, the motion detector 200 includes a transmission circuit 205, a reception circuit 210, and a controller 215. The transmission circuit 205 includes a radio frequency (RF) shape generator 220 (for example, a RF burst generator) and a transmission antenna 225. The reception circuit 210 includes a reception antenna 230, a low-noise amplifier 233, an amplifier 235 (for example, a gain control amplifier), a mixer 240, a sample and hold circuit 245, an op-amp 250, a controller 255, and an indicator 260. FIG. 2 provides one example of the motion detector 200 with normalized sensitivity. However, configurations and constructions that adjust the sensitivity for the motion detector 200 other than those illustrated and described herein are possible.

In the example illustrated, an output of the controller 215 is electrically coupled to the RF shape generator 220, and the RF shape generator 220 is electrically coupled to the transmission antenna 225. Outputs of the controller 215 are electrically coupled to the low-noise amplifier 233 and the amplifier 235. Another output of the controller 215 is electrically coupled to the mixer 240, and yet another output of the controller 215 is electrically coupled to the sample and hold circuit 245. The reception antenna 230 is electrically coupled to an input of the low-noise amplifier 233 and an output of the low-noise amplifier 233 is electrically coupled to an input of the amplifier 235. An output of the amplifier 235 is electrically coupled to the mixer 240. An output of the mixer 240 is electrically coupled to an input of the sample and hold circuit 245. An output of the sample and hold circuit 245 is electrically coupled to the op-amp 250. An output of the op-amp 250 is electrically coupled to the controller 255, and an output of the controller 255 is electrically coupled to the indicator 260.

Figure 5:
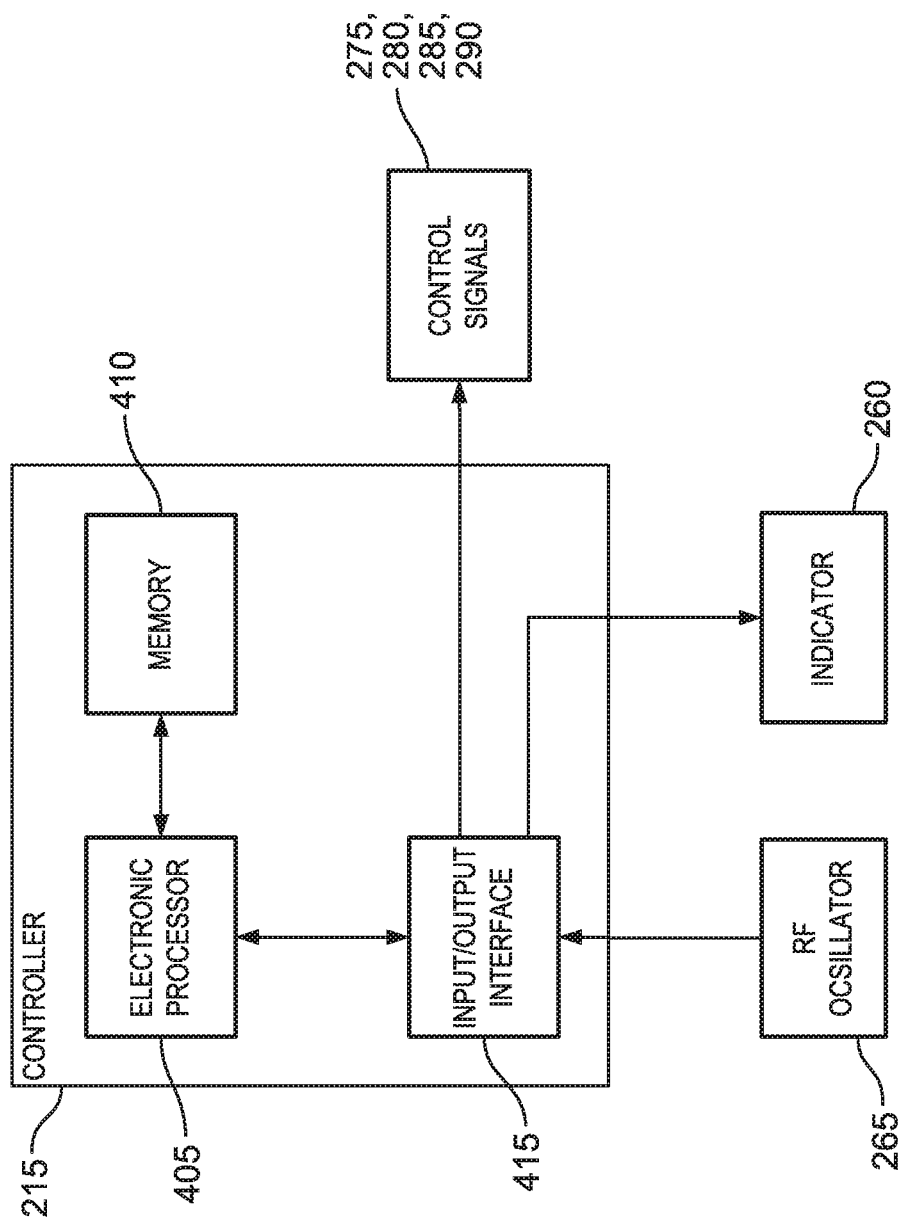
FIG. 5 is a diagram of a controller for the motion detectors in FIGS. 2 and 4 according to one embodiment.

In some embodiments, the controller 215 includes an RF oscillator 265 and a time gate and pulse generator circuit 270. A combination of these components provides the controller 215 with the ability to generate the control signals illustrated in FIGS. 6 and 7. The control signals include a control signal 275, a control signal 277, a control signal 280, a control signal 285, and a control signal 290. In some embodiments, the controller 215 generates the control signals using a combination of various hardware and software components. In one example, the controller 215 is implemented by a microcontroller as illustrated in FIG. 5 and described below. Similarly, the controller 255 may be implemented with a combination of hardware components. In one example, the controller 255 is implemented in the same hardware configuration as the controller 215. In other embodiments, the controller 255 is implemented with a particular hardware profile depending on the needs to the particular application. In one example, the motion detector 200 may have a single antenna for transmitting and receiving RF signals. In this embodiment, the transmission circuit 205 and the reception circuit 210 may be incorporated into a transceiver for transmission and reception while still using the concepts described herein.

The motion detector 200 may use multiple forms of RF transmission and reception. For example, the motion detectors 200, 300 may use infrared, microwave, or both for transmission and reception of RF waves. In some embodiments, the motion detector 200 activates the indicator based solely on a magnitude of the Doppler signal, as described below. In other embodiments, the motion detector 200 activates the indicator 260 based, at least in part, on the magnitude of the Doppler signal and another condition. For example, in some embodiments, the motion detector 200 sets a condition within the controller 255 indicative of a motion event based on the magnitude of the Doppler signal and activates the indicator 260 only upon confirmation of the motion event by another sensor located internally or externally from the motion detector 200. For example, in some embodiments, the indicator 260 is triggered based partially on stored information within the controller 255 indicative of whether the motion event was detected. In particular, the indicator 260 may be triggered based, at least in part, on activation of a bit in a register of the controller 255 indicative of the detection of the motion event. In this case, the indicator 260 may not be immediately triggered upon detection of a motion event. Rather, the indicator 260 may be triggered only when the bit indicates that the detection of the motion event has occurred and when the motion event is confirmed by another detector (for example, the infrared detector).

The indicator 260 may be of various forms and constructions. For example, the indicator 260 may include a visual device (for example, a light emitting diode (LED), an icon or light on a graphical display), an audio device (for example, a speaker, a siren, and the like), a haptic device (for example, a vibration alert device), or a combination of the foregoing. In some embodiments, the indicator 260 may include an alarm relay, an electronic switch, or other trigger that activates the indicator 260 based on a signal by the controller 255.

Figure 3B:
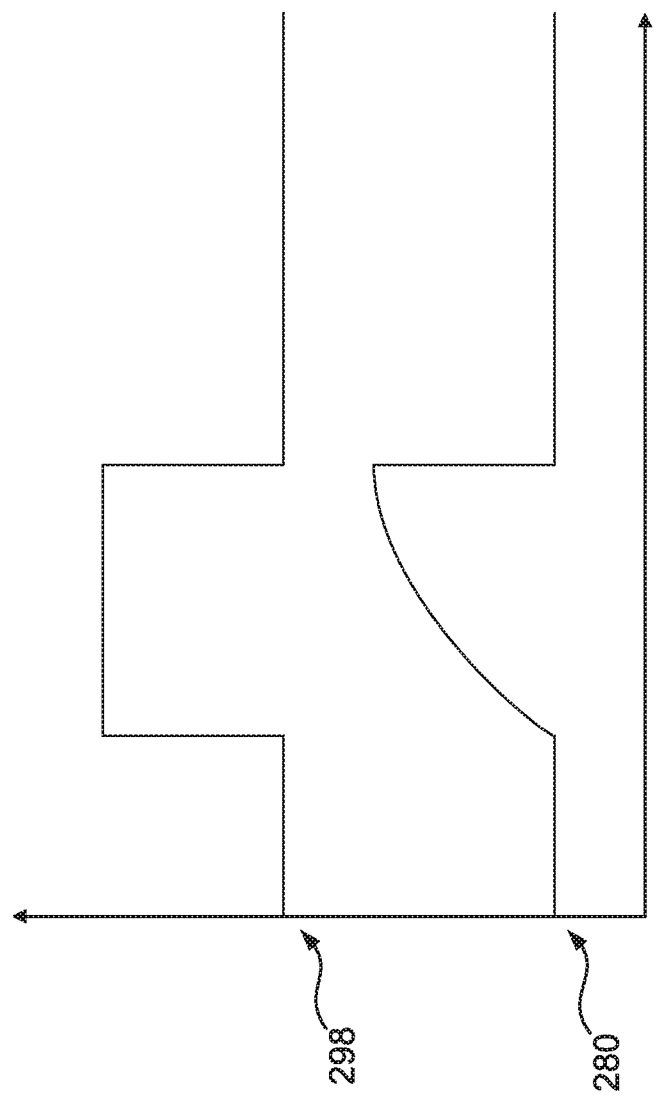
FIG. 3B is a diagram of an input waveform for the resistive-capacitive circuit of FIG. 2 and the control waveform for the motion detector of FIG. 2 according to one embodiment.
Figure 3A:
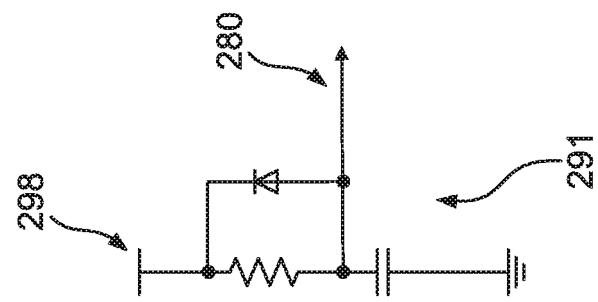
FIG. 3A is a schematic diagram of a resistive-capacitive circuit for generating a control waveform for the motion detector of FIG. 2 according to one embodiment.

FIG. 3A illustrates one example of a resistive-capacitive circuit 291 configured to generate the control signal 280. In this example, an input to the resistive-capacitive circuit 291 is electrically coupled to a resistor 292 and a diode 294. A capacitor 296 is electrically coupled to another side of the resistor 292 and the diode 294. The capacitor 296 is also electrically coupled to the output. A pulse input 298 is applied to the resistive-capacitive circuit 291 to generate the control signal 280 at the output. The resistive-capacitive circuit 291 may be constructed internally or externally to the controller 215. For example, when the resistive-capacitive circuit 291 is externally located from the controller 215, the pulse input 298 may be generated by the controller 215 and sent to the resistive-capacitive circuit 291. In another example, the pulse input 298 may be internally generated by the controller 215 and received at the resistive-capacitive circuit 291 internally within the controller 215. FIG. 3B illustrates a waveform of the pulse input 298 and a waveform of the control signal 280 (also illustrated in FIGS. 6 and 7).

Figure 4:
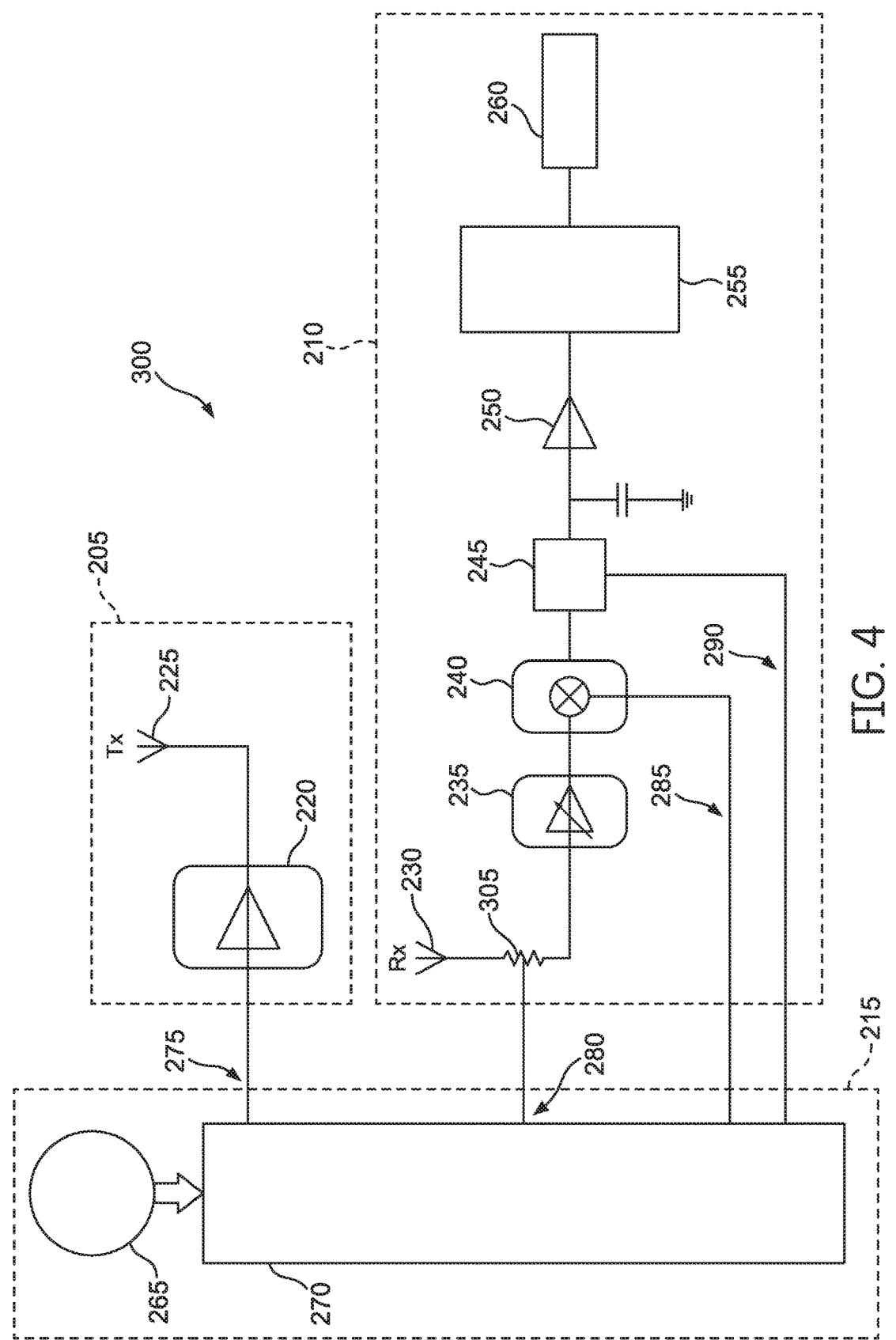
FIG. 4 is a diagram of a motion detector with normalized sensitivity according to another embodiment.

FIG. 4 illustrates a motion detector 300 with normalized sensitivity according to another embodiment. In the example illustrated, the motion detector 200 may include the same hardware as the motion detector 200. However, the motion detector 300 also includes a variable attenuator 305. Due to the presence of the variable attenuator 305, the controller 215 provides a control signal directly to the variable attenuator 305, rather than the amplifier 235 as in the motion detector 200. In this example, the amplifier 235 may be a low-noise amplifier. The motion detector 300 may function the same as the motion detector 200 with the exception of adjusting the signal strength of the RF signals with the variable attenuator 305. In the illustrated embodiment, an input of the variable attenuator 305 is electrically coupled to the reception antenna 230 and an output of the variable attenuator 305 is electrically coupled to the amplifier 235. In another embodiment (not illustrated), the input of the variable attenuator 305 is electrically coupled to the output of the amplifier 235 and the output of the variable attenuator 305 is electrically coupled to the mixer 240. In other words, the variable attenuator 305 may be positioned between the reception antenna 203 and the amplifier 235 or positioned between the amplifier 235 and the mixer 240. In either of these described embodiments, the variable attenuator 305 provides the controller 215 with the functionality of automatically and variably adjusting the attenuation of any received RF signals.

FIG. 5 illustrates components of the controller 215 and the controller 255 (hereafter labelled as controllers 215, 255) according to one embodiment. In the example illustrated, the controllers 215, 255 include a plurality of electrical and electronic components that provide power, operation control, and protection to the components and modules within the controllers 215, 255. The controllers 215, 255 include, among other things, an electronic processor 405 (such as a programmable electronic microprocessor, microcontroller, or similar device), a memory 410 (for example, non-transitory, machine readable memory), and an input/output interface 415. The controllers 215, 255 may include additional electronic processors or memory. The controllers 215, 255 may include, in addition to or in lieu of the electronic processor 405, application specific integrated circuits (ASICs), field programmable gate arrays (FPGAs), or both. The controllers 215, 255 are configured to implement, among other things, the processes and methods described herein. In other embodiments, the controllers 215, 255 include additional, fewer, or different components.

The electronic processor 405 is communicatively coupled to the memory 410 and executes instructions which are capable of being stored on the memory 410. The electronic processor 405 is configured to retrieve from memory 410 and execute instructions related to the methods of operation of the motion detector 200 or the motion detector 300. The electronic processor 405 is communicatively coupled to the input/output interface 415. The input/output interface 415 is communicatively coupled to hardware external to the controllers 215, 255. For example, the input/output interface 415 is communicatively coupled to the indicator 260 and the RF oscillator 265. In some embodiments, the input/output interface 415 may generate the control signals 275, 277, 280, 285, 290. In some embodiments, the input/output interface 415 directly or indirectly activates an indication of motion (for example, an alarm) by means of a central security system, a messaging system, a security network, a local alarm (for example, an alarm light or siren) and the like.

Figure 6:
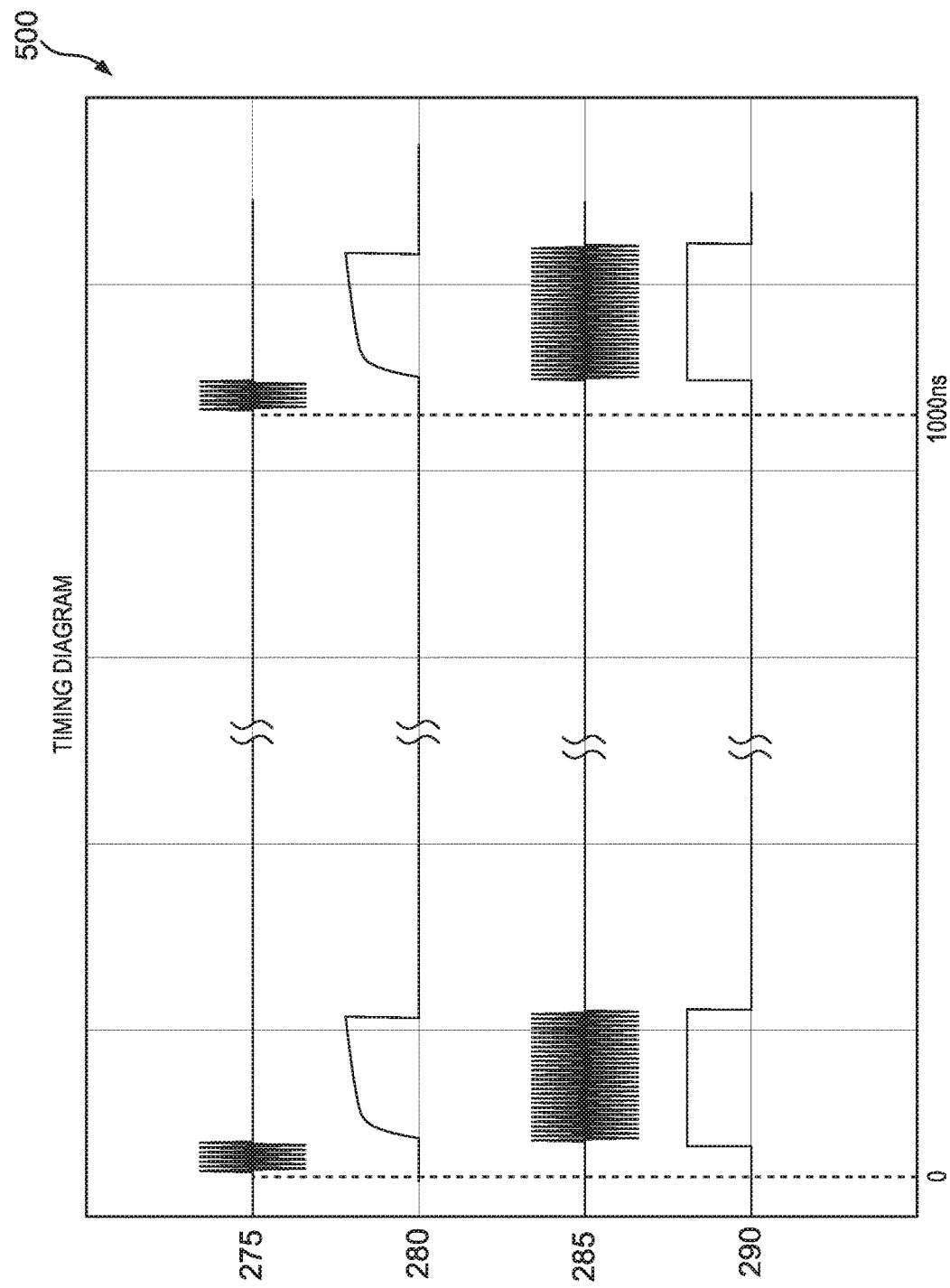
FIG. 6 is a diagram of a timing sequence for operational control of the motion detectors of FIGS. 2 and 4 that is initiated by the controller of FIG. 5 according to one embodiment.
Figure 7:
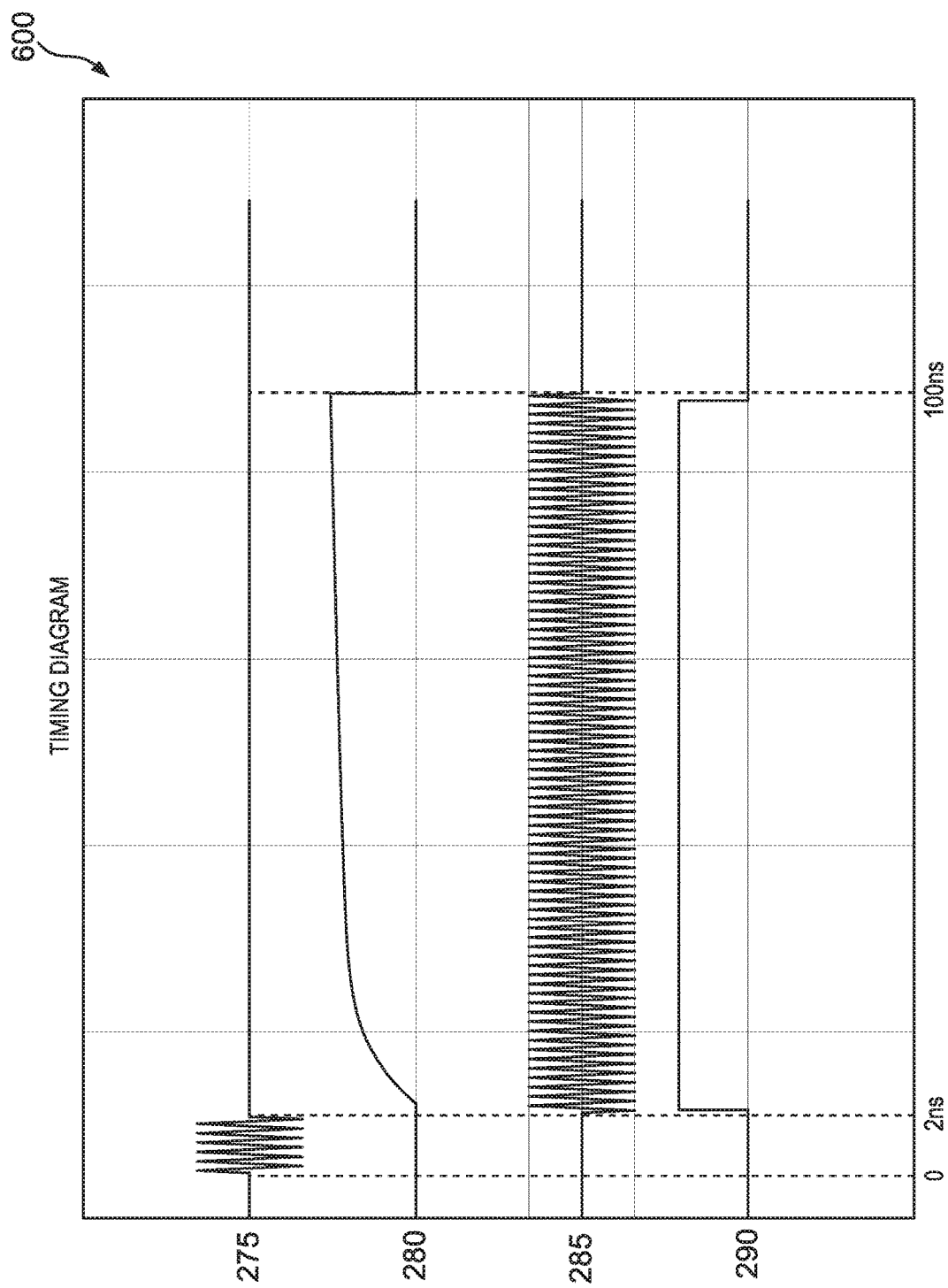
FIG. 7 is a diagram of a portion of the timing sequence of FIG. 6.

FIGS. 6 and 7 illustrate diagrams of a timing sequence for the control signals 275, 280, 285, 290 as generated by the controller 215 according to one embodiment. The diagrams in FIGS. 6 and 7 illustrate the same control signals 275, 280, 285, 290 at different levels of detail. In particular, FIG. 6 illustrates that a transmission and reception cycle may reoccur every 1000 nanoseconds. FIG. 7 illustrates a single transmission and reception cycle (for example, occurring over 100 nanoseconds). The timing sequences and control signals 275, 280, 285, 290 illustrated in FIGS. 6 and 7 will be referenced in discussion of the method below. The control signal 277 is not illustrated; however, the control signal 277 may have the same waveform and timing as illustrated by the control signal 290.

Figure 8:
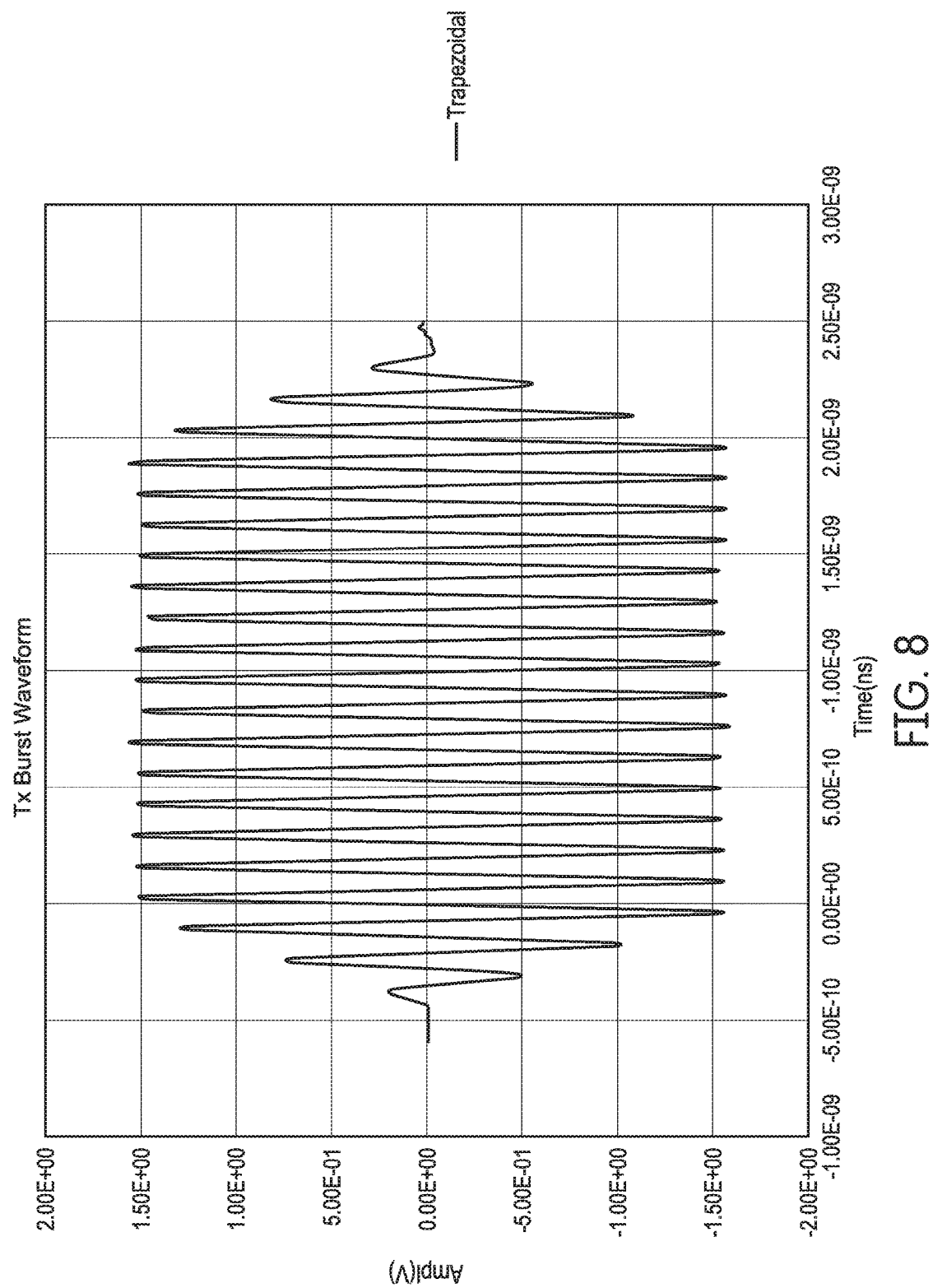
FIG. 8 is a diagram of a radio frequency transmission burst from the motion detectors of FIGS. 2 and 4 according to one embodiment.

The control signal 275 is sent from the controller 215 to the RF shape generator 220. Based on the control signal 275, the RF shape generator 220 generates RF burst according to a frequency and a time period of activation based on the control signal 275. FIG. 8 illustrates one example of an RF burst. In one example, the RF burst may be a transmission of RF energy at approximately 7.5 Giga-Hertz. The RF shape generator 220 may generate the RF burst over a time range of 0 to 2 nanoseconds while the control signal 275 is active. The RF burst may be a burst waveform of 500 Mega-Hertz bandwidth for ultra-wideband operation. The RF burst may be generated by the RF shape generator 220 in accordance with various RF regulations for transmitted RF waves. For example, The RF may be shaped to comply with Federal Communications Commission (FCC) parts 15.517 and 15.521 and European Communications Committee (ECC) technical requirements (CEPTREP034.pdf) including harmonics (−41.3 dBm/MHz EIRP, 0 dBm Peak EIRP, Bandwidth>500 MHz).

Figure 9:
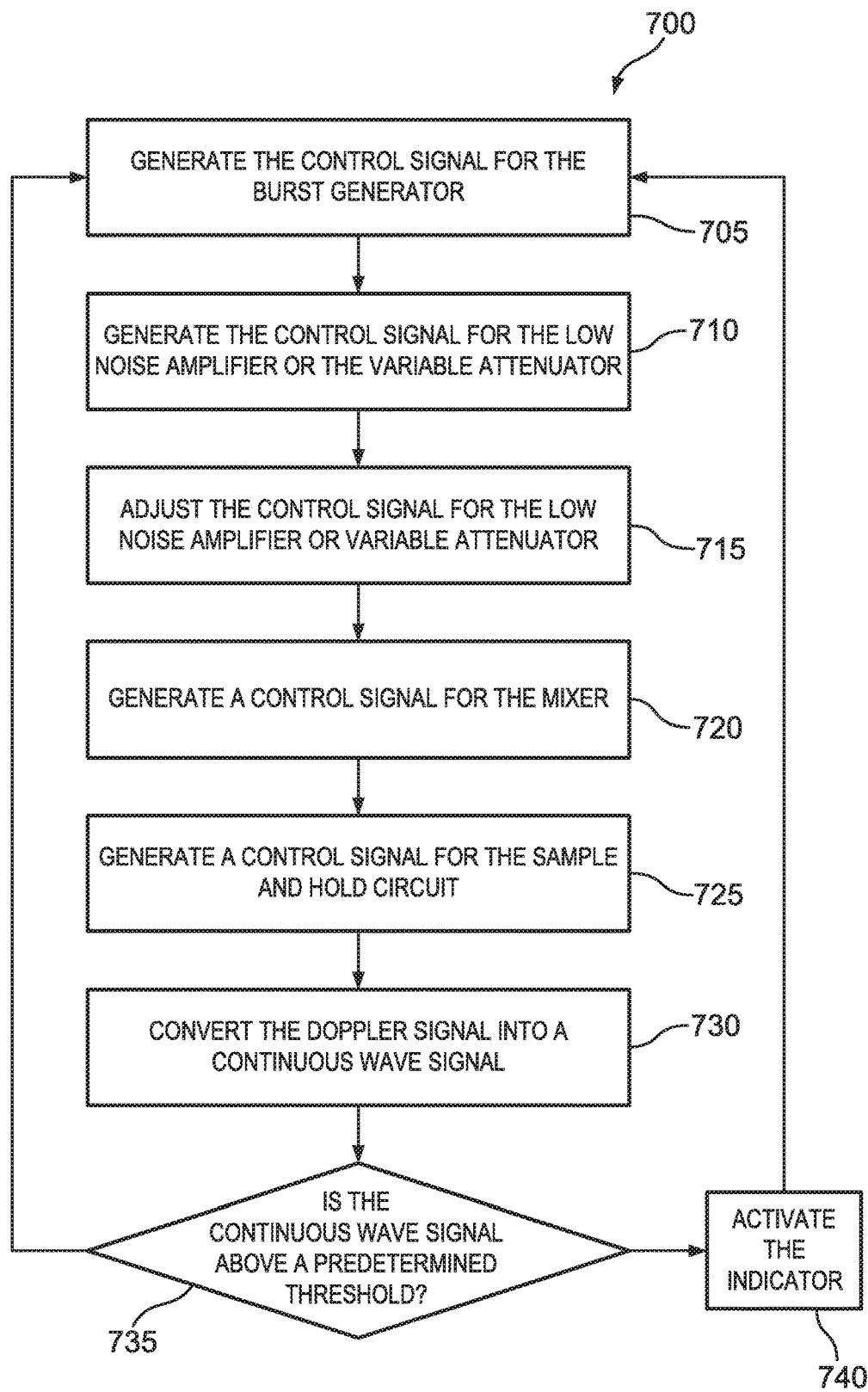
FIG. 9 is a flowchart of a method of operation of the motion detectors in FIGS. 2 and 4 according to one embodiment.

FIG. 9 illustrates a method 700 of operating the motion detector 200, 300 according to one embodiment. In the embodiment illustrated, the controller 215 generates the control signal 275 (block 705). The control signal 275 is sent from the controller 215 to the RF shape generator 220. After transmitting the RF waves, the controller 215 generates and outputs the control signal 280 to the amplifier 235 or the variable attenuator 305 (block 710). The control signal 280, as illustrated in FIGS. 6 and 7, may be a pulse that ramps higher in magnitude over time while applied to the variable attenuator 305 or the amplifier 235. However, each particular configuration may require a particular signal to achieve the proper adjustment of the reception circuit 210, such as an inverted or reversed signal to the one illustrated. The control signal 280 may be activated after the control signal 275 is completed to prevent immediate reception and amplification of the outgoing RF transmission. In some embodiments, the control signal 280 is activated as soon as the control signal 275 is completed. In other embodiments, the control signal 280 is activated after a short delay (for example, 3 nanoseconds) after the control signal 275 is active 505. The delay serves several purposes. For example, the delay avoids saturation of the amplifier 235 during the RF transmission period and ignores reflections caused by objects in the immediate vicinity of the motion detector 200, 300.

The controller 215 adjusts the control signal 280 to increase the gain of the amplifier 235 or decrease the attenuation of the variable attenuator 305 over the time period that it is active (block 715). For example, the control signal 280 may be active for approximately 100 nanoseconds depending on the desired range of the motion detector 200, 300. As a consequence, the received RF signal is adjusted to compensate for RF reflections received at various amplitudes corresponding to various distances. In particular, RF reflections that are received later in the reception cycle are naturally attenuated due to travelling a greater distance (for example, due to dispersion), and thus result in lower amplitude received signals. The adjustment, by the controller 215, to the control signal 280, increases the amplitude of these lower amplitude received signals.

The controller 215 also generates a control signal 285 (for example, a local oscillator signal) after the control signal 275 is generated (block 720). The controller 215 outputs the control signal 285 to the mixer 240. The mixer 240 provides a Doppler signal based on a combination of the control signal 285 and the received RF signal. For example, the Doppler signal may represent a difference between the control signal 285 and the received RF signal. The Doppler signal may have a low frequency (for example, 0.1 to 100 Hertz). The control signal 285 sets a detection range for the motion detector 200, 300. For example, the control signal 285 may be active for 100 nanoseconds to provide a particular detection range for the motion detector 200, 300. Since it takes approximately 2 nanoseconds for the transmitted RF wave to be reflected back to the reception circuit 210 for each foot of detection range, a 100 nanosecond control signal limits the detection range to 50 feet. As a consequence, reflected RF waves received after 100 nanoseconds do not create the Doppler signal due to the lack of the control signal 285 after 100 nanoseconds.

The controller 215 also generates a control signal 290 and sends the control signal 290 to the sample and hold circuit 245 (block 725). As illustrated, the control signal 290 may be a 100 nanosecond pulse to activate the sample and hold circuit 245 during reception of the reflected signal. Since the transmitted RF wave may be transmitted as a burst, the sample and hold circuit 245 converts the Doppler signal, which also may be received as a burst, into a continuous wave signal (block 730). In some embodiments, a signal from the output of the sample and hold circuit 245 is amplified by the op-amp 250 before being sent to the controller 255. The controller 255 compares the continuous wave signal to a predetermined threshold (block 735) and activates the indicator 260 when the continuous wave signal is above the predetermined threshold (block 740).

Figure 1:
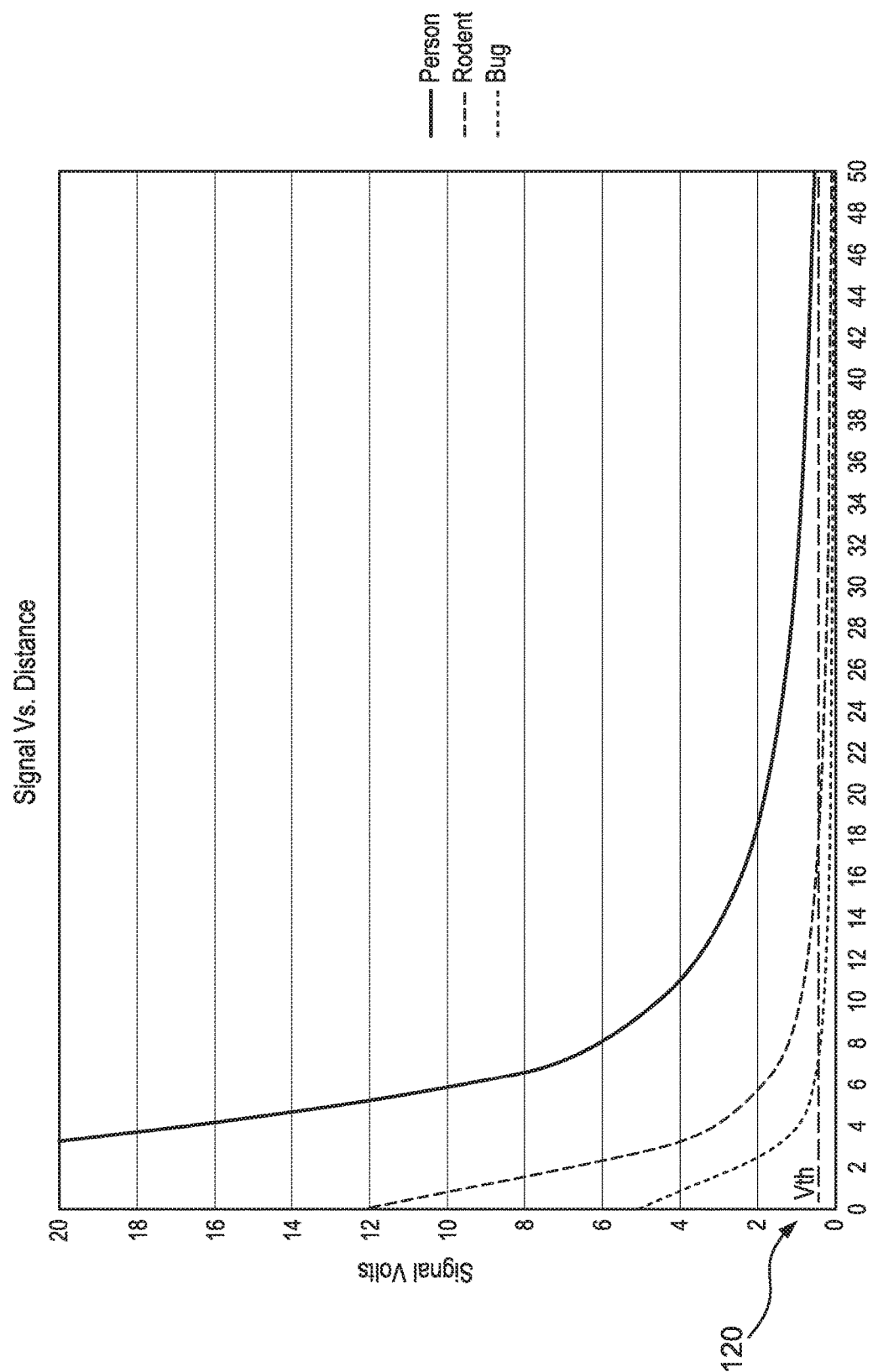
FIG. 1 is a graph of signal strength versus distance for various detected objects in motion detectors as currently known in the art.
Figure 10:
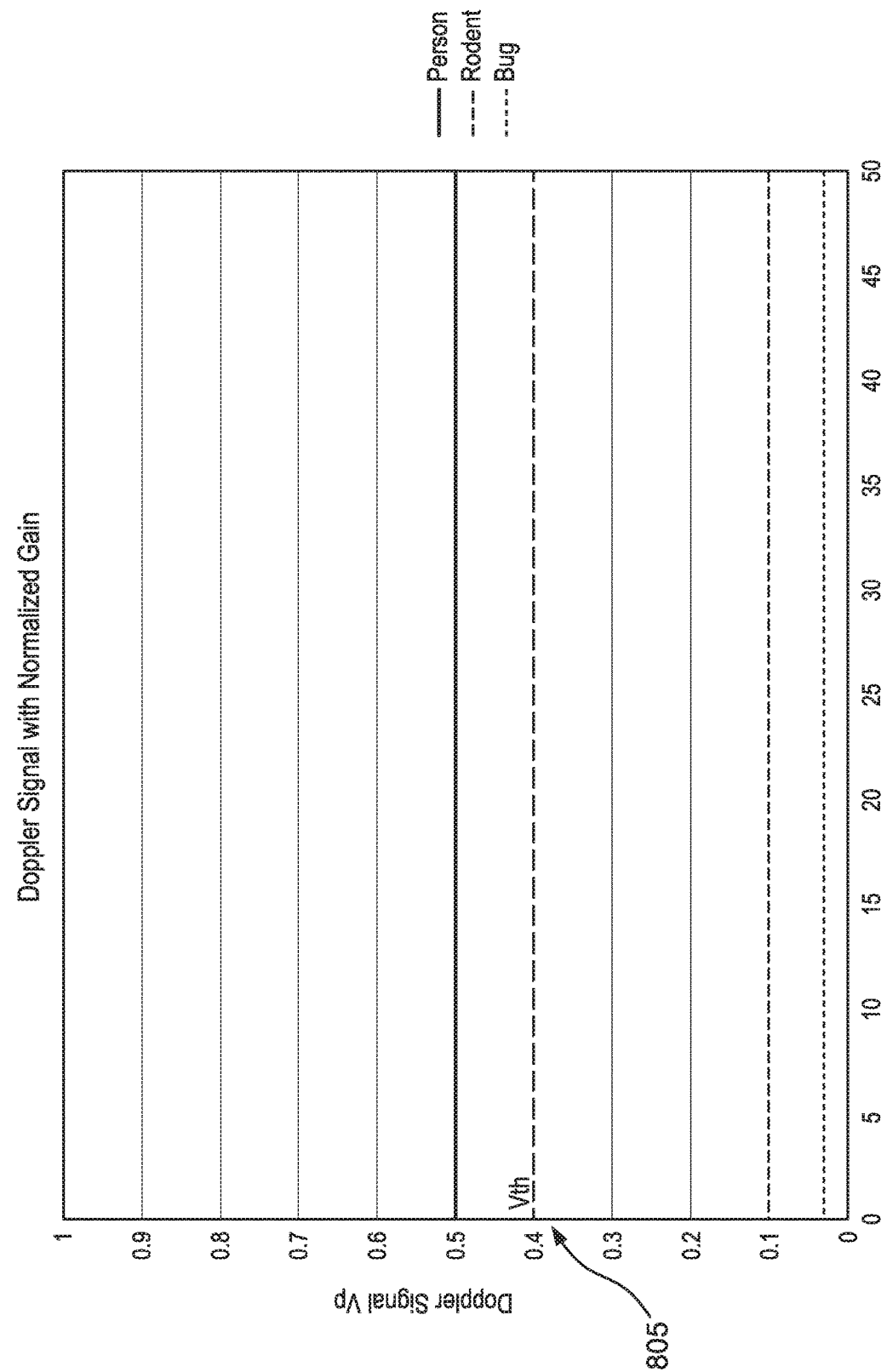
FIG. 10 is a graph of signal strength versus distance for various detected objects in the motion detectors of FIGS. 2 and 4.

FIG. 10 illustrates a graph of signal strength versus distance for the motion detector 200, 300. The graph includes examples of Doppler signal strength for various objects detected by the motion detector 200, 300. In the illustrative example, the detected objects include a person, a rodent, and a bug. Due to the adjustment performed by the amplifier 235 or the variable attenuator 305, the Doppler signal is normalized over distance for the detected objects. For example, the amplitude of the Doppler signal remains flat over the detection range of 50 feet for each of the detected objects. A threshold 805 (i.e., the predetermined threshold described above) is indicated by a dashed line. Due to the normalization of the Doppler signal, the person is the only detected object that is above the threshold 805 at any distance range. As a consequence, only the person triggers the indicator 260. This may reduce or eliminate false alarms caused from objects close to the motion detector 200, 300. Compare this to FIG. 1, where at close distances all the Doppler signals from the detected objects exceed the threshold.

Thus, embodiments of the invention provide, among other things, a motion detector with normalized detection and a method of performing motion detection by normalizing a Doppler signal. Various features and advantages of the invention are set forth in the following claims.

What is claimed is:
1. A motion detector comprising:
a radio frequency (RF) transmission circuit;
an RF reception circuit including an amplifier and a variable attenuator positioned between a reception antenna and the amplifier;
a controller that is electrically coupled to the RF transmission circuit and the RF reception circuit, the controller configured to:
control the RF transmission circuit to generate an RF signal,
control the RF reception circuit to receive a reflected RF signal from a target object in a predetermined time for reception after transmission of the RF signal;
control the RF reception circuit to generate a Doppler signal indicative of a distance between the target object and the motion detection system based on the reflected RF signal;
adjust a sensitivity of the RF reception circuit during the predetermined time for reception by applying a pulse to the variable attenuator; and
activate an indicator based, at least in part, on a magnitude of the Doppler signal.

2. The motion detector of claim 1, wherein the controller is configured to adjust the sensitivity of the RF reception circuit by adjusting a magnitude of the received, reflected RF signal.

3. The motion detector of claim 1, wherein the controller is further configured to adjust the sensitivity of the RF reception circuit by normalizing the Doppler signal.

4. The motion detector of claim 1, wherein the RF reception circuit includes a mixer electrically coupled to the amplifier; a sample and hold circuit electrically coupled to the mixer; and an op-amp electrically coupled to the sample and hold circuit.

5. The motion detector of claim 4, wherein the controller is further configured to increase a gain of the amplifier during the predetermined time for reception.

6. The motion detector of claim 4, wherein the controller is configured to adjust the sensitivity of the RF reception circuit by adjusting the variable attenuator.

7. The motion detector of claim 4, wherein the RF reception circuit further includes a low-noise amplifier electrically coupled to the amplifier.

8. The motion detector of claim 1, wherein the controller is configured to activate the indicator when the magnitude of the Doppler signal is greater than a predetermined threshold.

9. A method of detecting motion with a motion detector, the method comprising:
generating an RF signal with a radio frequency (RF) transmission circuit;
receiving a reflected RF signal with a RF reception circuit including an amplifier and a variable attenuator positioned between a reception antenna and the amplifier from a target object in a predetermined time for reception after transmission of the RF signal;
generating a Doppler signal indicative of a distance to the target object based on the reflected RF signal;
adjusting a sensitivity of the RF reception circuit during the predetermined time for reception by applying a pulse to the variable attenuator; and
activating an indicator based, at least in part, on a magnitude of the Doppler signal.

10. The method of detecting motion of claim 9, wherein adjusting the sensitivity of the RF reception circuit includes adjusting a magnitude of the received, reflected RF signal.

11. The method of detecting motion of claim 9, wherein adjusting the sensitivity of the RF reception circuit includes normalizing the Doppler signal.

12. The method of detecting motion of claim 9, the method further comprising:

receiving the reflected RF signal at the amplifier and amplifying the reflected RF signal to create an amplified signal;

receiving the amplified signal at a mixer;

receiving the Doppler signal at a sample and hold circuit; and amplifying the Doppler signal at an op-amp after receiving the Doppler signal at the sample and hold circuit.

13. The method of detecting motion of claim 12, the method further comprising increasing a gain of the amplifier during the predetermined time for reception.

14. The method of detecting motion of claim 12, the method comprising activating the indicator when the magnitude of the Doppler signal is greater than a predetermined threshold.

* * * * *